US012804391B2

(12) United States Patent
Huang et al.

(10) Patent No.: US 12,804,391 B2
(45) Date of Patent: Nov. 17, 2026

(54) APPLICATION LAYER KEY GENERATION

(71) Applicant: Alipay (Hangzhou) Information Technology Co., Ltd., Hangzhou (CN)

(72) Inventors: Lin Huang, Hangzhou (CN); Yunding Jian, Hangzhou (CN); Wei Fu, Hangzhou (CN); Hongjian Cao, Hangzhou (CN); Wanqiao Zhang, Hangzhou (CN); Yujia Liu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 158 days.

(21) Appl. No.: 18/552,025

(22) PCT Filed: Feb. 18, 2022

(86) PCT No.: PCT/CN2022/076773
§ 371 (c)(1),
(2) Date: Sep. 22, 2023

(87) PCT Pub. No.: WO2022/199291
PCT Pub. Date: Sep. 29, 2022

(65) Prior Publication Data
US 2024/0179517 A1 May 30, 2024

(30) Foreign Application Priority Data
Mar. 25, 2021 (CN) ......................... 202110317802.5

(51) Int. Cl.
*H04W 12/041* (2021.01)
*H04W 4/80* (2018.01)
*H04W 12/0431* (2021.01)

(52) U.S. Cl.
CPC .......... *H04W 12/041* (2021.01); *H04W 4/80* (2018.02); *H04W 12/0431* (2021.01)

(58) Field of Classification Search
CPC .......... H04W 12/041; H04W 12/0431; H04W 12/50; H04W 4/80; Y02D 30/70
See application file for complete search history.

(56) References Cited

U.S. PATENT DOCUMENTS

2012/0254959 A1* 10/2012 Schmidt .............. H04L 63/0815 726/6
2013/0007858 A1* 1/2013 Shah ................ H04W 12/0431 726/6

(Continued)

FOREIGN PATENT DOCUMENTS

CN 102523087 A 6/2012
CN 106714146 A 5/2017

(Continued)

OTHER PUBLICATIONS

International Search Report and Written Opinion of Application No. PCT/CN2022/076773, mailed Apr. 19, 2022, 7 pages.

(Continued)

*Primary Examiner* — Azizul Choudhury

(57) ABSTRACT

Embodiments of this specification provide an application layer key generation method and apparatus. According to the method in the embodiments, a connection mode used when a Bluetooth connection to an external Bluetooth device is established is first determined, an application layer key generation function is determined according to the determined connection mode, a link layer dynamic parameter used at a link layer is obtained, an application layer key identifier agreed upon with the external Bluetooth device is obtained, and an application layer key is generated by using the application layer key generation function, the link layer dynamic parameter, and the application layer key identifier.

8 Claims, 2 Drawing Sheets

(56) References Cited

U.S. PATENT DOCUMENTS

| | | | | |
|---|---|---|---|---|
| 2013/0340067 | A1 * | 12/2013 | Lindteigen | H04L 63/162 726/15 |
| 2015/0229475 | A1 * | 8/2015 | Benoit | H04W 12/069 713/168 |
| 2019/0116619 | A1 | 4/2019 | Hauck et al. | |
| 2021/0058770 | A1 * | 2/2021 | Tian | H04L 63/0442 |

FOREIGN PATENT DOCUMENTS

| | | | | |
|---|---|---|---|---|
| CN | 111740827 | A | 10/2020 | |
| CN | 113038444 | A | 6/2021 | |
| WO | WO-2012092604 | A2 * | 7/2012 | H04W 12/06 |

OTHER PUBLICATIONS

“Extended European Search report” regarding Intl. Application No. 22773953.9, mailed on Aug. 16, 2024. pp. 1-11.

Core Specification Working Group: “Bluetooth Core Specification, V5.2”, Internet Citation, Dec 31, 2019 (Dec. 31, 2019), pp. 1-3256, XP009545985, Retrieved from the Internet: URL: https://www.bluetooth.com/specifications/specs/core-specification.

* cited by examiner

APPLICATION LAYER KEY GENERATION

CROSS-RELATED APPLICATIONS

This application is a national stage entry of international application no. PCT/CN2022/076773 filed on Feb. 18, 2022, which is herein incorporated by reference in its entirety.

TECHNICAL FIELD

One or more embodiments of this specification relate to the field of Bluetooth technologies, and in particular, to application layer key generation methods and apparatuses.

BACKGROUND

Bluetooth technology is a radio technology that supports short-distance communication between devices. Wireless data communication can be performed between devices that establish a Bluetooth connection. To ensure security of communication data, in addition to encrypting the communication data by using a link layer key at a link layer, the communication data can be encrypted at an application layer by using an application layer key, so as to implement double layer encryption of the communication data.

Currently, the application layer key is predetermined in firmware of a Bluetooth device, an application layer key predetermined in each Bluetooth device is the same, and the application layer key is easily cracked reversely by an attacker. Therefore, a more reliable application layer key generation solution needs to be provided.

SUMMARY

One or more embodiments of this specification describe application layer key generation methods and apparatuses, so as to reduce a possibility that an application layer key is cracked by an attacker.

According to a first aspect, an application layer key generation method is provided, including: determining a connection mode used when a Bluetooth connection to an external Bluetooth device is established; determining an application layer key generation function according to the connection mode; determining, according to the application layer key generation function, a link layer dynamic parameter used at a link layer; obtaining an application layer key identifier agreed upon with the external Bluetooth device; and generating an application layer key according to the application layer key generation function, the link layer dynamic parameter, and the application layer key identifier.

In an embodiment, the connection mode is a basic rate/enhanced data rate mode; the determining an application layer key generation function according to the connection mode includes: determining an f2 function used when a link layer key is generated as the application layer key generation function; the determining a link layer dynamic parameter used at a link layer includes: determining a random number in each key parameter used by the f2 function in calculating the link layer key as the link layer dynamic parameter; and the generating an application layer key includes: replacing a link layer key identifier in each key parameter used by the f2 function in calculating the link layer key with the application layer key identifier; and calculating, by using the f2 function, each key parameter obtained after replacement, to obtain the application layer key.

In an embodiment, the application layer key identifier is different from the link layer key identifier.

In an embodiment, the connection mode is a basic rate/enhanced data rate mode or a low energy mode; the determining an application layer key generation function according to the connection mode includes: determining an h6 function as the application layer key generation function; the determining a link layer dynamic parameter used at a link layer includes: obtaining a link layer key generated when the Bluetooth connection to the external Bluetooth device is established; and determining the link layer key as the link layer dynamic parameter; and the generating an application layer key includes: calculating the application layer key identifier and the link layer key by using the h6 function, to obtain the application layer key.

In an embodiment, when the connection mode is a basic rate/enhanced data rate mode, the link layer key is generated by using an f2 function and a link layer key identifier; and the application layer key identifier is the same as or different from the link layer key identifier.

In an embodiment, when the connection mode is a low energy mode, the link layer key is generated by using an f5 function.

According to a second aspect, an application layer key generation apparatus is further provided, including: a connection mode determining unit, configured to determine a connection mode used when a Bluetooth connection to an external Bluetooth device is established; an application layer key generation function determining unit, configured to determine an application layer key generation function according to the connection mode; a link layer dynamic parameter acquisition unit, configured to determine, according to the application layer key generation function, a link layer dynamic parameter used at a link layer; an application layer key identifier acquisition unit, configured to obtain an application layer key identifier agreed upon with the external Bluetooth device; and an application layer key generation unit, configured to generate an application layer key according to the application layer key generation function, the link layer dynamic parameter, and the application layer key identifier.

In an embodiment, the connection mode is a basic rate/enhanced data rate mode; the application layer key generation function determining unit is configured to: determine an f2 function used when a link layer key is generated as the application layer key generation function; the link layer dynamic parameter acquisition unit is configured to: determine a random number in each key parameter used by the f2 function in calculating the link layer key as the link layer dynamic parameter; and the application layer key generation unit is configured to: replace a link layer key identifier in each key parameter used by the f2 function in calculating the link layer key with the application layer key identifier; and calculate, by using the f2 function, each key parameter obtained after replacement, to obtain the application layer key.

In an embodiment, the application layer key identifier is different from the link layer key identifier.

In an embodiment, the connection mode is a basic rate/enhanced data rate mode or a low energy mode; the application layer key generation function determining unit is configured to: determine an h6 function as the application layer key generation function; the link layer dynamic parameter acquisition unit is configured to: obtain a link layer key generated when the Bluetooth connection to the external Bluetooth device is established; and determine the link layer key as the link layer dynamic parameter; and the application layer key generation unit is configured to: calculate the application layer key identifier and the link layer key by using the h6 function, to obtain the application layer key.

In an embodiment, when the connection mode is a basic rate/enhanced data rate mode, the link layer key is generated by using an f2 function and a link layer key identifier; and the application layer key identifier is the same as or different from the link layer key identifier.

In an embodiment, when the connection mode is a low energy mode, the link layer key is generated by using an f5 function.

According to a third aspect, a computing device is provided, including a memory and a processor, where the memory stores executable code, and when executing the executable code, the processor implements the method described in any one of the embodiments of this specification.

In the application layer key generation method and apparatus provided in the embodiments of this specification, a Bluetooth device determines an application layer key generation function according to a connection mode used when establishing a Bluetooth connection to an external Bluetooth device, determines a link layer dynamic parameter used at a link layer according to the determined application layer key generation function, and generates an application layer key according to the application layer key generation function, the link layer dynamic parameter, and an application layer key identifier agreed upon with the external Bluetooth device. Because the link layer dynamic parameter used at the link layer is dynamically generated, the application layer key generated by using the link layer dynamic parameter also dynamically changes, so a possibility that the application layer key is cracked by an attacker can be reduced.

BRIEF DESCRIPTION OF DRAWINGS

To describe technical solutions in embodiments of this specification or in the existing technology more clearly, the following briefly describes the accompanying drawings needed for describing the embodiments or the existing technology. Clearly, the accompanying drawings in the following descriptions show some embodiments of this specification, and a person of ordinary skill in the art can still derive other drawings from these accompanying drawings without creative efforts.

DESCRIPTION OF EMBODIMENTS

The following describes the solutions provided in this specification with reference to the accompanying drawings.

Currently, an application layer key is written by an application developer, and the application layer key is predetermined in firmware of a Bluetooth device or is hard coded in an application (APP) of the Bluetooth device. The application layer key is fixed, and an application layer key predetermined in each Bluetooth device is the same. Once the application layer key is reversely cracked by an attacker, the attacker can obtain the application layer key in each Bluetooth device, which affects security of data communication between Bluetooth devices.

If security of data communication between Bluetooth devices needs to be improved, it can be considered that an application layer key generated each time is dynamically changed. The application layer key can be generated in a manner of calculating some parameters by using a function, but it needs to be ensured that two Bluetooth devices that establish a Bluetooth connection can learn of a function and a parameter that are used for generating an application layer key each time.

A function used to generate an application layer key each time can be determined by using a connection mode used to establish a Bluetooth connection each time.

For a parameter used to generate an application layer key, if one of Bluetooth devices generates the parameter and then distributes the parameter to another Bluetooth device, the distribution process is not only complex but also insecure. In this case, a link layer dynamic parameter used at a link layer can be considered. Because the link layer itself generates a link layer dynamic parameter each time a Bluetooth connection is established, and link layer dynamic parameters used by Bluetooth devices at both ends at the link layer are the same. Therefore, if the link layer dynamic parameter used at the link layer is used as a parameter used when an application layer key is generated, a parameter distribution process is not required, and the Bluetooth devices at both ends can learn of the link layer dynamic parameter. In addition, the link layer dynamic parameter changes dynamically each time a Bluetooth connection is established, so it can be met that an application layer key generated each time by using the link layer dynamic parameter changes dynamically.

The following describes specific implementations of the previous concept.

Figure 1:
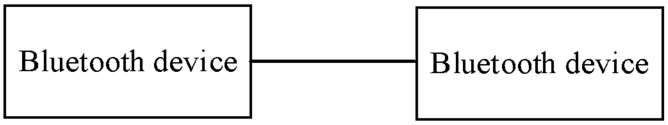
FIG. 1 is a schematic diagram illustrating a system architecture applied to an application layer key generation method, according to an embodiment of this specification.

To facilitate understanding of this specification, a system architecture used in this specification is first described. As shown in FIG. 1, the system architecture mainly includes two Bluetooth devices. For example, one Bluetooth device is a dragonfly host, and the other Bluetooth device is a Bluetooth keyboard.

A Bluetooth chip is disposed in each Bluetooth device, and the Bluetooth chip is configured to establish a Bluetooth connection to a Bluetooth chip of the other Bluetooth device, so short-distance wireless data communication can be implemented between two Bluetooth devices that successfully establish a Bluetooth connection. In a wireless data communication process, the Bluetooth device separately encrypts communication data once at an application layer and a link layer, and sends communication data encrypted twice to a Bluetooth device at the other end. After receiving the encrypted communication data, the Bluetooth device at the other end obtains the communication data by means of corresponding decryption twice, thereby ensuring transmission security of the communication data. Because a link layer key is generated in a process of establishing a Bluetooth connection, the following describes a specific implementation process of an application layer key generation method.

Figure 2:
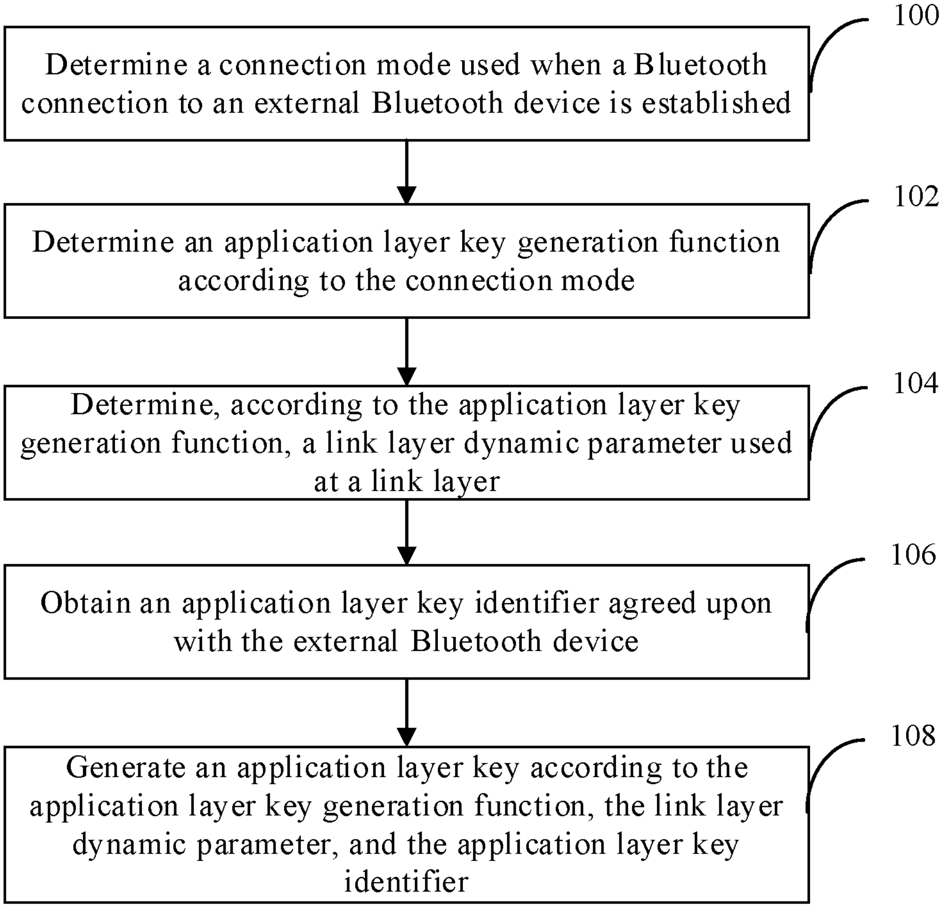
FIG. 2 is a flowchart illustrating an application layer key generation method, according to an embodiment of this specification.

FIG. 2 is a flowchart illustrating an application layer key generation method, according to an embodiment. It can be understood that the method can be performed by any apparatus, device, platform, or device cluster that has computing and processing capabilities. Referring to FIG. 2, after this, a specific implementation includes: Step 200: determine a connection mode used when a Bluetooth connection to an external Bluetooth device is established; Step 202: determine an application layer key generation function according to the connection mode; Step 204: determine, according to the application layer key generation function, a link layer dynamic parameter used at a link layer; Step 206: obtain an application layer key identifier agreed upon with the external Bluetooth device; and Step 208: generate an application layer key according to the application layer key generation function, the link layer dynamic parameter, and the application layer key identifier.

In the application layer key generation method shown in FIG. 2, a Bluetooth device can determine an application layer key generation function according to a connection mode used when establishing a Bluetooth connection to an external Bluetooth device, determine a link layer dynamic parameter used at a link layer according to the determined application layer key generation function, and generate an application layer key according to the application layer key generation function, the link layer dynamic parameter, and an application layer key identifier agreed upon with the external Bluetooth device. Because the link layer dynamic parameter used at the link layer is dynamically generated, the application layer key generated by using the link layer dynamic parameter also dynamically changes, so a possibility that the application layer key is cracked by an attacker can be reduced. In addition, the link layer dynamic parameter used at the link layer is generated in a process of establishing a Bluetooth connection. Therefore, using the existing parameter as a parameter used to generate an application layer key can avoid a complex parameter distribution process.

The following describes an implementation of each step shown in FIG. 2.

Step 200: Determine a connection mode used when a Bluetooth connection to an external Bluetooth device is established.

There are many types of electronic devices that can implement a Bluetooth connection, such as a mobile phone, a tablet computer, a notebook computer, a camera, a mouse, a keyboard, and a wrist band. Different types of devices use different connection modes when establishing a Bluetooth connection.

In this step, the determined connection mode of the Bluetooth connection can include two types: a basic rate/enhanced data rate (BR/EDR) mode and a low energy (LE) mode. The BR/EDR mode is mainly used in audio and streaming media applications, and one-to-one device communication is created by using a peer-to-peer network topology. The LE mode is mainly used for devices operating depending on batteries, and uses multiple network topologies such as point-to-point, broadcast, and network.

Step 202: Determine an application layer key generation function according to the determined connection mode.

In this embodiment of this specification, the application layer key generation function is used to generate an application layer key, and the generated application layer key needs to satisfy the following three conditions:

Condition 1: An application layer key generated each time is dynamically changed.

Condition 2: Two Bluetooth devices need to learn of an application layer key generation function used each time and a key parameter used in the application layer key generation function.

Condition 3: The application layer key generated each time is different from another key used in the current Bluetooth connection.

The application layer key generation function that is used each time and that two Bluetooth devices in the previous condition 2 need to learn of can be determined by using a connection mode used when establishing a Bluetooth connection to an external Bluetooth device. The following separately describes the determined application layer key generation function for the previous two connection modes.

1. The Connection Mode is the BR/EDR Mode.

Because there are multiple calculation functions in a Bluetooth standard, to reduce research and development costs, a calculation function in the Bluetooth standard can be directly used as an application layer key generation function. In an embodiment of this specification, in the BR/EDR mode, at least an f2 function used when a link layer key is generated in the Bluetooth standard or an h6 function in the Bluetooth standard can be used as the application layer key generation function. The following separately describes the two functions.

Manner A: Determine the f2 function used when the link layer key is generated as the application layer key generation function.

In the BR/EDR mode, after establishing a Bluetooth connection, a Bluetooth chip generates the link layer key by using the f2 function, and an expression of the f2 function is shown in the following equation (1):

$$LK=f2(DHkey, N\_master, N\_slave, \text{"btlk"}, BD\_ADDR\_master, BD\_ADDR\_slave) \quad (1)$$

LK is used to represent the link layer key generated by using the f2 function in the BR/EDR mode, DHkey is a key generated in a process of establishing a Bluetooth connection by the Bluetooth chip, N_master is a random number generated by a primary Bluetooth device in two Bluetooth devices that establish a Bluetooth connection, N_slave is a random number generated by a secondary Bluetooth device in the two Bluetooth devices that establish a Bluetooth connection, "btlk" is a link layer key identifier with a length of 32 bits, BD_ADDR_master is a private address of the primary Bluetooth device in the two Bluetooth devices that establish a Bluetooth connection, and BD_ADDR_slave is a private address of the secondary Bluetooth device in the two Bluetooth devices that establish a Bluetooth connection.

It can be learned from the previous expression of the f2 function that key parameters used when the link layer key is calculated by using the f2 function include two random numbers N_master and N_slave. Because the two random numbers are randomly generated in each process of establishing a Bluetooth connection, in this embodiment of this specification, the two random numbers can be determined as link layer dynamic parameters used at the link layer in step 204. Because the link layer dynamic parameter changes dynamically, when the application layer key is generated by using the f2 function and the link layer dynamic parameter in step 208, an application layer key generated each time can change dynamically, thereby satisfying the previous condition 1.

In addition, the key parameter used when the link layer key is calculated by using the f2 function has been stored in Bluetooth devices at both ends in a process of establishing a Bluetooth connection. Therefore, the key parameter used when the link layer key is calculated by using the f2 function can be used as the key parameter used in the application layer key generation function. As such, without needing to distribute the key parameter, the Bluetooth devices at both ends can learn of the key parameter used in the application layer key generation function. In addition, the application layer key generation function is determined by using the connection mode, so the previous condition 2 is satisfied.

It can be understood that if the generated application layer key is the same as another key used in the current Bluetooth connection, for example, is the same as the link layer key, encryption is performed on communication data by using two same keys, and security of the communication data is affected. Therefore, the link layer key identifier "btlk" in the key parameter used by the f2 function in calculating the link layer key can be replaced with the application layer key identifier obtained in step 206, so the key parameter used by the f2 function in calculating the application layer key is different from the key parameter used by the f2 function in calculating the link layer key. Therefore, the generated application layer key is different from the link layer key, thereby satisfying the previous condition 3.

Based on the previous description, an expression of the application layer key generation function can be obtained as shown in the following equation (2):

$$APP\_AES\_Key = f2(DHkey, N\_master, N\_slave, KeyID, BD\_ADDR\_master, BD\_ADDR\_s\ lave) \quad (2)$$

APP_AES_Key is an application layer key generated by using the f2 function, and KeyID is an application layer key identifier.

Manner B: Determine an h6 function as the application layer key generation function.

An h6 function exists in the Bluetooth standard, and an expression of the h6 function is shown in the following equation (3):

$$Key = h6(W, KeyID0) \quad (3)$$

Key is used to represent a key generated by using the h6 function, W is used to represent an encryption key, and KeyID0 is a key identifier in the function, and a length is 32 bits.

Because the h6 function calculates the encryption key and the key identifier to generate the Key, it can be considered that a key parameter used in the h6 function is replaced to generate the application layer key in this embodiment of this specification. In this embodiment of this specification, the key parameter in equation (3) can be replaced to obtain an expression of the h6 function shown in the following equation (4):

$$App\_AES\_Key = h6(LK, KeyID) \quad (4)$$

APP_AES_Key is an application layer key generated by using the h6 function, LK is a link layer key generated by using the f2 function and the link layer key identifier by using the expression (1) in the BR/EDR mode, and KeyID is an application layer key identifier.

The key parameter used when the application layer key is calculated by using the h6 function includes the link layer key LK. It can be learned from the previous description of manner A that, because the key parameter used when the link layer key is calculated by using the f2 function includes two random numbers, the link layer key LK generated each time the Bluetooth connection is established is dynamically changed. In this embodiment of this specification, the link layer key can be determined as the link layer dynamic parameter used at the link layer in step 204. Because the link layer dynamic parameter changes dynamically, when the application layer key is generated by using the h6 function and the link layer dynamic parameter in step 208, an application layer key generated each time can change dynamically, thereby satisfying the previous condition 1.

In addition, in each process of establishing a Bluetooth connection, Bluetooth devices at both ends generate and store the link layer key LK. Therefore, the link layer key is directly used as the key parameter used in the application layer key generation function, so the key parameter may not need to be distributed, and the Bluetooth devices at both ends can learn of the key parameter used in the application layer key generation function. In addition, the application layer key generation function is determined by using the connection mode, so the previous condition 2 is satisfied.

It can be understood that a key parameter (LK, KeyID) used by the h6 function in calculating the application layer key is different from a key parameter (W, KeyID0) used by the h6 function in the Bluetooth standard in calculating the key. Therefore, the calculated application layer key is different from the key, so the previous condition 3 is satisfied.

2. The Connection Mode is the LE Mode.

In this embodiment of this specification, in the LE mode, at least the h6 function in the Bluetooth standard can be used as the application layer key generation function.

It can be learned from the description of Manner B in which the connection mode is the BR/EDR mode that the key parameter in equation (3) can be replaced to obtain an expression of the h6 function shown in the following equation (5):

$$App\_AES\_Key = h6(LTK, KeyID) \quad (5)$$

APP_AES_Key is an application layer key generated by using the h6 function, LTK is a link layer key generated by using the f5 function in the LE mode, and KeyID is an application layer key identifier.

An expression of the f5 function is shown in the following equation (6):

$$LTK = f5(DHKey, Na, Nb, A, B) \quad (6)$$

DHKey is a key generated in a process of establishing a Bluetooth connection by the Bluetooth chip, Na is a random number generated by a primary Bluetooth device in two Bluetooth devices that establish a Bluetooth connection, Nb is a random number generated by a secondary Bluetooth device in the two Bluetooth devices that establish a Bluetooth connection, A is a private address of the primary Bluetooth device in the two Bluetooth devices that establish a Bluetooth connection, and B is a private address of the secondary Bluetooth device in the two Bluetooth devices that establish a Bluetooth connection.

The key parameter used when the application layer key is calculated by using the h6 function includes the link layer key LTK is obtained by means of calculation according to the previous f5 function. It can be learned, according to the f5 function, that the key parameter used when the link key is calculated includes two random numbers Na and Nb. Therefore, the link layer key LTK generated each time the Bluetooth connection is established is dynamically changed. In this embodiment of this specification, the link layer key can be determined as the link layer dynamic parameter used at the link layer in step 204. Because the link layer dynamic parameter changes dynamically, when the application layer key is generated by using the h6 function and the link layer dynamic parameter in step 208, an application layer key generated each time can change dynamically, thereby satisfying the previous condition 1.

In addition, in each process of establishing a Bluetooth connection, Bluetooth devices at both ends generate and store the link layer key LTK. Therefore, the link layer key is directly used as the key parameter used in the application layer key generation function, so the key parameter may not need to be distributed, and the Bluetooth devices at both ends can learn of the key parameter used in the application layer key generation function. In addition, the application layer key generation function is determined by using the connection mode, so the previous condition 2 is satisfied.

It can be understood that a key parameter (LTK, KeyID) used by the h6 function in calculating the application layer key is different from a key parameter (W, KeyID0) used by the h6 function in the Bluetooth standard in calculating the key. Therefore, the calculated application layer key is different from the key, so the previous condition 3 is satisfied.

Step 204: Determine, according to the application layer key generation function, a link layer dynamic parameter used at a link layer.

In this embodiment of this specification, in step 202, if the determined application layer key generation function is different, the obtained link layer dynamic parameter is also different. Specifically, if in step 202, the f2 function used to generate the link layer key is determined as an application layer key generation function, in this step 204, a random number in each key parameter used by the f2 function in calculating the link layer key is determined as the link layer dynamic parameter.

If in step 202, the h6 function is determined as an application layer key generation function, in this step 24, a link layer key generated when a Bluetooth connection to an external Bluetooth device is established is first obtained, and then the link layer key is determined as the link layer dynamic parameter.

Step 206: Obtain an application layer key identifier agreed upon with the external Bluetooth device.

It can be learned from step 202 that both the length of the link layer key identifier in the f2 function and the length of the key identifier in the h6 function are 32 bits. Therefore, for ease of calculation, the length of the application layer key identifier can also be 32 bits.

In this embodiment of this specification, the application layer key identifier needs to be agreed upon in advance by two Bluetooth devices that establish a Bluetooth connection. For example, in a possible implementation, the application layer key identifier can be predetermined in firmware of the Bluetooth device or hard coded in an application program installed on the Bluetooth device. The Bluetooth device can obtain the predetermined application layer key identifier from firmware or hard code.

In this embodiment of this specification, there can be one or more predetermined application layer key identifiers. When there are multiple predetermined application layer key identifiers, the two Bluetooth devices need to agree upon a selection rule of the application layer key identifier in advance, so the two Bluetooth devices select a same application layer key identifier.

It can be learned from step 202 that an application layer key that needs to be generated satisfies at least the previous condition 3. Based on this, in the following two premises, the application layer key identifier needs to satisfy different conditions:

Premise 1: The connection mode is the BR/EDR mode, and the application layer key generation function is the f2 function.

Under the premise 1, a condition that the application layer key identifier needs to satisfy is that the application layer key identifier is different from the link layer key identifier.

Only when the application layer key identifier is different from the link layer key identifier, when the application layer key and the link layer key are calculated by using the f2 function, key parameters used are not completely the same. Therefore, the generated application layer key and the link layer key are different.

Premise 2: The connection mode is the BR/EDR mode, and the application layer key generation function is the h6 function.

Under the premise 2, a condition that the application layer key identifier needs to satisfy is that the application layer key identifier is the same as or different from the link layer key identifier.

Under the premise 2, functions used for calculating the application layer key and the link layer key are different. Therefore, regardless of whether the application layer key identifier is the same as or different from the link layer key identifier, the application layer key and the link layer key that are obtained by means of calculation are different.

Step 208: Generate an application layer key according to the application layer key generation function, the link layer dynamic parameter, and the application layer key identifier.

In this embodiment of this specification, if the application layer key generation function determined in step 202 is different, a calculation process in which the application layer key is generated is different. Specifically, Case 1: The application layer key generation function is the f2 function.

In this case, in step 204, the random number included in each key parameter used by the f2 function in calculating the link layer key is determined as a link layer dynamic parameter.

Correspondingly, an implementation process of step 208 includes: replacing a link layer key identifier in each key parameter used by the f2 function in calculating the link layer key with the application layer key identifier; and calculating, by using the f2 function, each key parameter obtained after replacement, to obtain the application layer key.

Case 2: The application layer key generation function is the h6 function.

In this case, in step 204, the link layer key generated when the Bluetooth connection to the external Bluetooth device is established is obtained. The link layer key is determined as the link layer dynamic parameter. Correspondingly, an implementation process of step 208 includes: calculating the application layer key identifier and the link layer key by using the h6 function, to obtain the application layer key.

The previous completes a process of generating an application layer key.

In this embodiment of this specification, the application layer key can be stored in the Bluetooth device after being generated, so the application layer key can be directly used by the Bluetooth devices during data communication.

To further improve security of data communication and reduce a possibility of being cracked by an attacker, an update mechanism of an application layer key can be executed between two Bluetooth devices, so as to update the application layer key, so an updated application layer key is different from a non-updated application layer key. After the application layer key is updated, the Bluetooth devices encrypt and decrypt subsequent data for communication by using the updated application layer key. The following describes the update mechanism of the application layer key.

Manners of updating the application layer key can include at least the following three manners.

Manner 1: Periodic Update.

As such, an update period can be specified. After the specified update period is reached, the application layer key is regenerated, and the regenerated application layer key is used to update a locally stored application layer key.

Manner 2: Follow an Update Mechanism of the Link Layer Key.

As such, whenever the link layer key needs to be regenerated, the application layer key is regenerated, and the regenerated application layer key is used to update a locally stored application layer key.

Manner 3: Update after the Bluetooth Device is Restarted.

As such, the application layer key can be recorded in a memory. The application layer key in the memory is cleared each time after the Bluetooth device is restarted. In this case, an application layer key needs to be regenerated.

In the previous embodiment of this specification, a Bluetooth device can determine an application layer key generation function according to a connection mode used when establishing a Bluetooth connection to an external Bluetooth device, determine a link layer dynamic parameter used at a link layer according to the determined application layer key generation function, and generate an application layer key according to the application layer key generation function, the link layer dynamic parameter, and an application layer key identifier agreed upon with the external Bluetooth device. Because the link layer dynamic parameter used at the link layer is dynamically generated, the application layer key generated by using the link layer dynamic parameter also dynamically changes, so a possibility that the application layer key is cracked by an attacker can be reduced. In addition, the link layer dynamic parameter used at the link layer is generated in a process of establishing a Bluetooth connection. Therefore, using the existing parameter as a parameter used to generate an application layer key can avoid a complex parameter distribution process.

Figure 3:
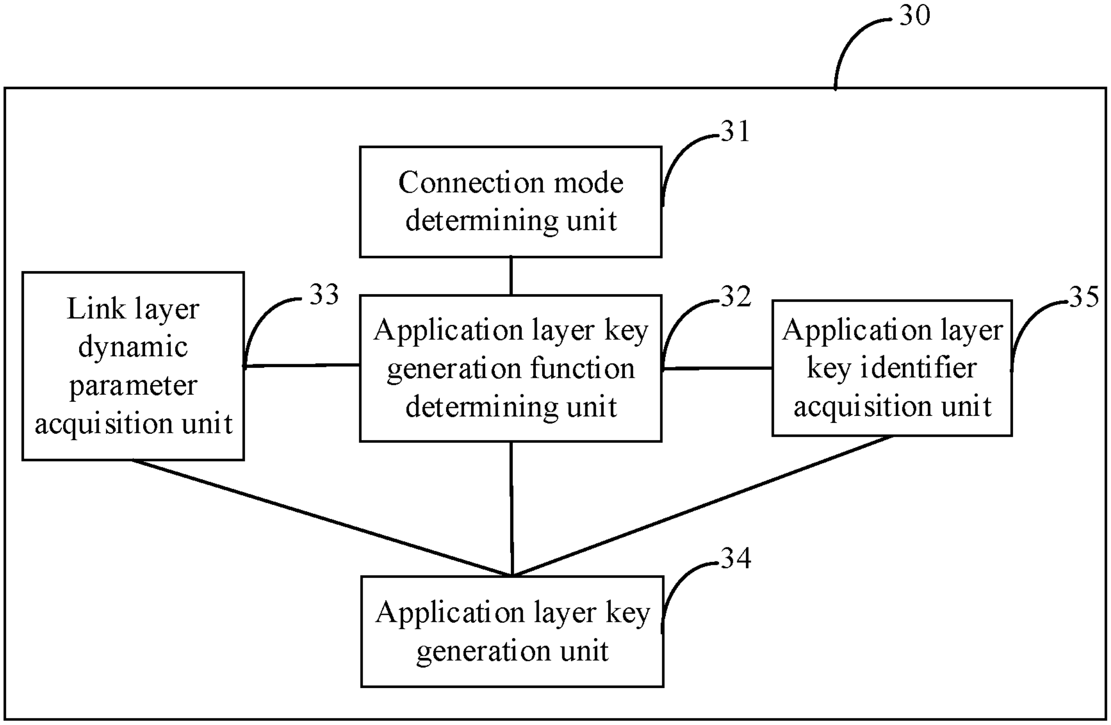
FIG. 3 is a schematic diagram illustrating an application layer key generation apparatus according to an embodiment of this specification.

According to an embodiment of another aspect, an application layer key generation apparatus is further provided. FIG. 3 shows an application layer key generation apparatus according to an embodiment. It can be understood that the apparatus can be implemented by any apparatus, device, platform, or device cluster that has computing and processing capabilities. As shown in FIG. 3, the apparatus 30 includes: a connection mode determining unit 31, configured to determine a connection mode used when a Bluetooth connection to an external Bluetooth device is established; an application layer key generation function determining unit 32, configured to determine an application layer key generation function according to the connection mode; a link layer dynamic parameter acquisition unit 33, configured to determine, according to the application layer key generation function, a link layer dynamic parameter used at a link layer; an application layer key identifier acquisition unit 34, configured to obtain an application layer key identifier agreed upon with the external Bluetooth device; and an application layer key generation unit 35, configured to generate an application layer key according to the application layer key generation function, the link layer dynamic parameter, and the application layer key identifier.

In a possible implementation, the connection mode is a basic rate/enhanced data rate mode; the application layer key generation function determining unit is configured to: determine an f2 function used when a link layer key is generated as the application layer key generation function; the link layer dynamic parameter acquisition unit is configured to: determine a random number in each key parameter used by the f2 function in calculating the link layer key as the link layer dynamic parameter; and the application layer key generation unit is configured to: replace a link layer key identifier in each key parameter used by the f2 function in calculating the link layer key with the application layer key identifier; and calculate, by using the f2 function, each key parameter obtained after replacement, to obtain the application layer key.

In a possible implementation, the application layer key identifier is different from the link layer key identifier.

In a possible implementation, the connection mode is a basic rate/enhanced data rate mode or a low energy mode; the application layer key generation function determining unit is configured to: determine an h6 function as the application layer key generation function; the link layer dynamic parameter acquisition unit is configured to: obtain a link layer key generated when the Bluetooth connection to the external Bluetooth device is established; and determine the link layer key as the link layer dynamic parameter; and the application layer key generation unit is configured to: calculate the application layer key identifier and the link layer key by using the h6 function, to obtain the application layer key.

In a possible implementation, when the connection mode is a basic rate/enhanced data rate mode, the link layer key is generated by using an f2 function and a link layer key identifier; and the application layer key identifier is the same as or different from the link layer key identifier.

In a possible implementation, when the connection mode is a low energy mode, the link layer key is generated by using an f5 function.

An embodiment of this specification provides a computing device, including a memory and a processor, where the memory stores executable code, and when the processor executes the executable code, the method in any embodiment of this specification is implemented and executed.

It can be understood that a structure shown in this embodiment of this specification does not constitute a specific limitation on the application layer key generation apparatus. In some other embodiments of this specification, the application layer key generation apparatus can include more or fewer components than those shown in the figure, combine some components, split some components, or have different component arrangements. The components shown in the figure can be implemented by hardware, software, or a combination of software and hardware.

Content such as information exchange and execution processes between modules in the previous apparatus and system is based on the same concept as that in the method embodiment of this specification. For specific content, refer to the description in the method embodiment of this specification. Details are omitted here for simplicity.

The embodiments in this specification are described in a progressive way. For the same or similar parts of the embodiments, references can be made to the embodiments. Each embodiment focuses on a difference from other embodiments. Particularly, an apparatus embodiment is similar to a method embodiment, and therefore is described briefly. For a related part, references can be made to some descriptions in the method embodiment.

A person skilled in the art should be aware that in the previous one or more examples, functions described in this specification can be implemented by hardware, software, pendant, or any combination thereof. When this specification is implemented by software, the functions can be stored in a computer readable medium or transmitted as one or more instructions or code in the computer readable medium.

The objectives, technical solutions, and benefits of this specification are further described in detail in the earlier-described specific implementations. It should be understood that the earlier-described descriptions are merely specific implementations of this specification, but are not intended to limit the protection scope of this specification. Any modification, equivalent replacement, or improvement made based on the technical solutions of this specification shall fall within the protection scope of this specification.

What is claimed is:

1. An application layer key generation method, comprising:

determining a connection mode used when a Bluetooth connection between a Bluetooth device and an external Bluetooth device is established;

determining an application layer key generation function according to the connection mode;

determining, according to the application layer key generation function, a link layer dynamic parameter used at a link layer, wherein the link layer dynamic parameter is a dynamic parameter generated by the link layer during establishment of the Bluetooth connection and used for a link layer security mechanism, wherein the link layer dynamic parameter is obtained without distributing the link layer dynamic parameter between the Bluetooth device and the external Bluetooth device;

obtaining an application layer key identifier agreed upon with the external Bluetooth device; and generating an application layer key according to the application layer key generation function, the link layer dynamic parameter, and the application layer key identifier.

2. The method according to claim 1, wherein the connection mode is a basic rate/enhanced data rate mode;

the determining an application layer key generation function according to the connection mode comprises:

determining an f2 function used when a link layer key is generated as the application layer key generation function;

the determining a link layer dynamic parameter used at a link layer comprises:

determining a random number in each key parameter used by the f2 function in calculating the link layer key as the link layer dynamic parameter; and the generating an application layer key comprises:

replacing a link layer key identifier in each key parameter used by the f2 function in calculating the link layer key with the application layer key identifier; and calculating, by using the f2 function, each key parameter obtained after replacement, to obtain the application layer key.

3. The method according to claim 2, wherein the application layer key identifier is different from the link layer key identifier.

4. The method according to claim 1, wherein the connection mode is a basic rate/enhanced data rate mode or a low energy mode;

the determining an application layer key generation function according to the connection mode comprises:

determining an h6 function as the application layer key generation function;

the determining a link layer dynamic parameter used at a link layer comprises:

obtaining a link layer key generated when the Bluetooth connection to the external Bluetooth device is established; and determining the link layer key as the link layer dynamic parameter; and the generating an application layer key comprises:

calculating the application layer key identifier and the link layer key by using the h6 function, to obtain the application layer key.

5. The method according to claim 4, wherein when the connection mode is a basic rate/enhanced data rate mode, the link layer key is generated by using an f2 function and a link layer key identifier; and the application layer key identifier is the same as or different from the link layer key identifier.

6. The method according to claim 4, wherein when the connection mode is a low energy mode, the link layer key is generated by using an f5 function.

7. A computing device, comprising a memory and a processor, wherein the memory stores executable instructions that, in response to execution by the processor, cause the processor to:

determine a connection mode used when a Bluetooth connection between a Bluetooth device and an external Bluetooth device is established;

determine an application layer key generation function according to the connection mode;

determine, according to the application layer key generation function, a link layer dynamic parameter used at a link layer, wherein the link layer dynamic parameter is a dynamic parameter generated by the link layer during establishment of the Bluetooth connection and used for a link layer security mechanism, wherein the link layer dynamic parameter is obtained without distributing the link layer dynamic parameter between the Bluetooth device and the external Bluetooth device;

obtain an application layer key identifier agreed upon with the external Bluetooth device; and generate an application layer key according to the application layer key generation function, the link layer dynamic parameter, and the application layer key identifier.

8. A non-transitory computer-readable storage medium having stored therein instructions that, when executed by a processor of a computing device, cause the processor to:

determine a connection mode used when a Bluetooth connection between a Bluetooth device and an external Bluetooth device is established;

determine an application layer key generation function according to the connection mode;

determine, according to the application layer key generation function, a link layer dynamic parameter used at a link layer, wherein the link layer dynamic parameter is a dynamic parameter generated by the link layer during establishment of the Bluetooth connection and used for a link layer security mechanism, wherein the link layer dynamic parameter is obtained without distributing the link layer dynamic parameter between the Bluetooth device and the external Bluetooth device;

obtain an application layer key identifier agreed upon with the external Bluetooth device; and generate an application layer key according to the application layer key generation function, the link layer dynamic parameter, and the application layer key identifier.

* * * * *